H. J. SMITH.
CLUTCH.
APPLICATION FILED JULY 31, 1919.

1,431,053.

Patented Oct. 3, 1922.
5 SHEETS—SHEET 3.

Inventor
Harry J. Smith
by Geyer & Popp
Attorneys

H. J. SMITH.
CLUTCH.
APPLICATION FILED JULY 31, 1919.
1,431,053.
Patented Oct. 3, 1922.
5 SHEETS—SHEET 4.
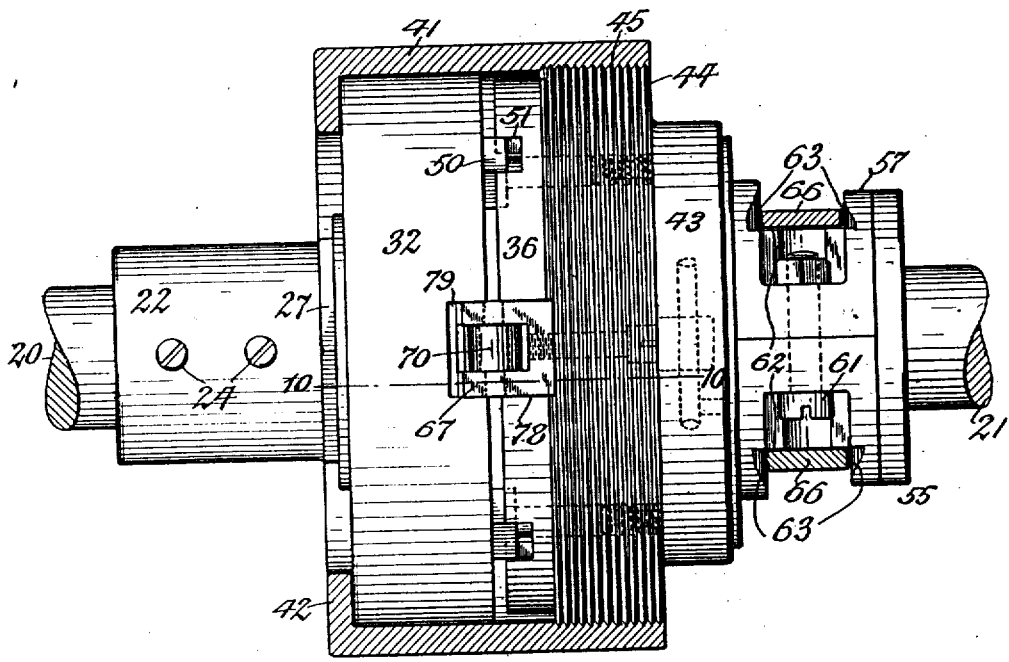
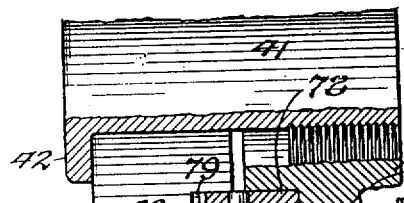
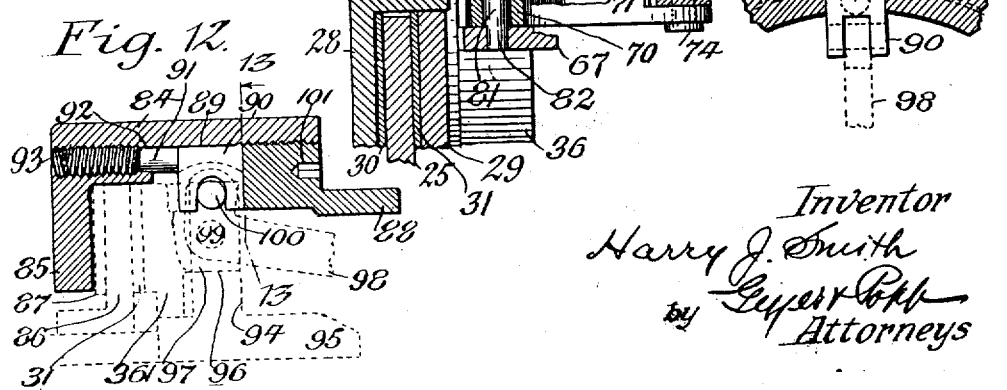
Inventor
Harry J. Smith
by Geyer & Potts
Attorneys H. J. SMITH.
CLUTCH.
APPLICATION FILED JULY 31, 1919.
1,431,053.
Patented Oct. 3, 1922.
5 SHEETS—SHEET 5.
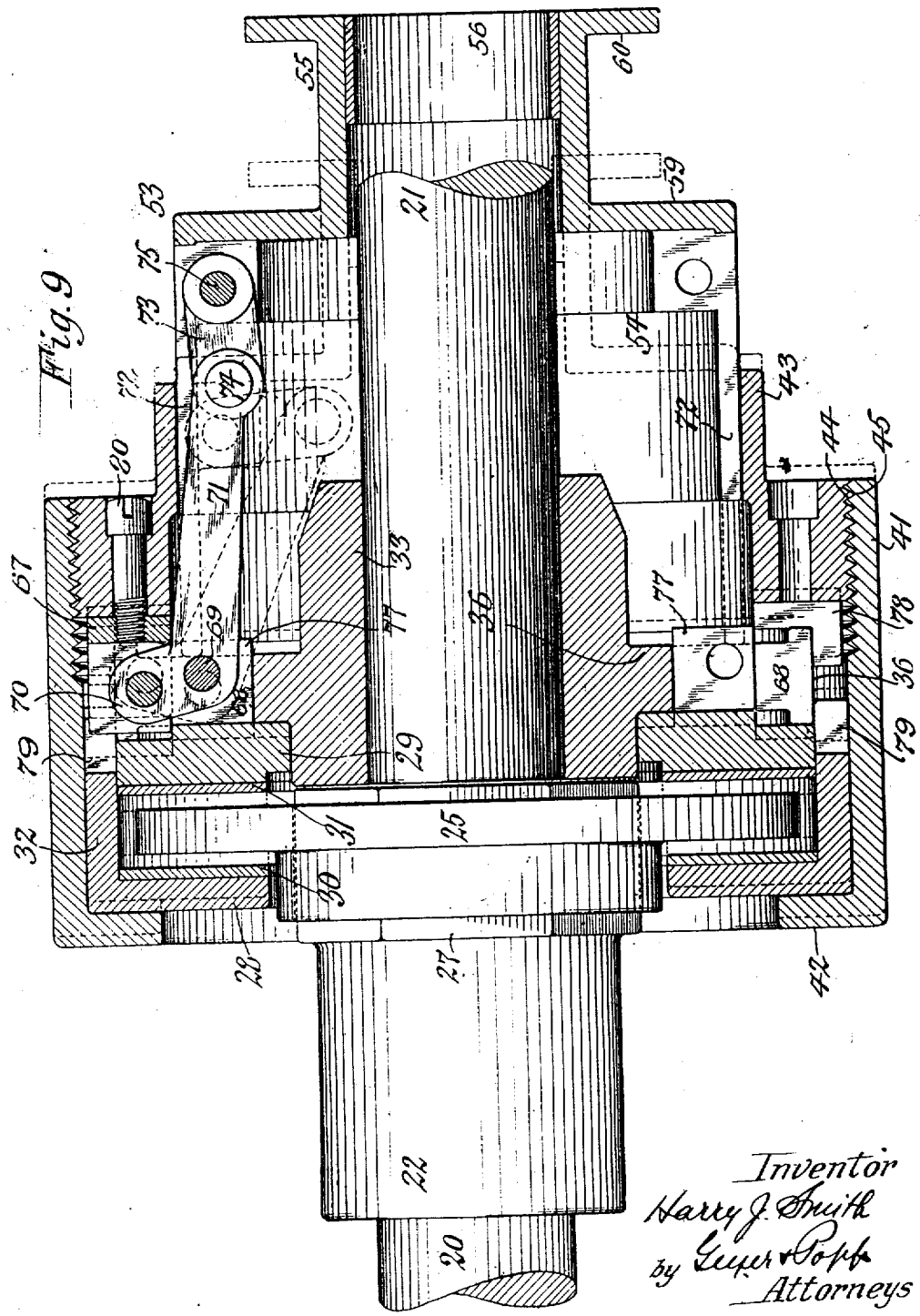
Inventor
Harry J. Smith
by Geyer & Popp
Attorneys Patented Oct. 3, 1922.

1,431,053

UNITED STATES PATENT OFFICE.

HARRY J. SMITH, OF LAKEWOOD, OHIO.

CLUTCH.

Application filed July 31, 1919. Serial No. 314,397.

*To all whom it may concern:*

Be it known that I, HARRY J. SMITH, a citizen of the United States, residing at Lakewood, in the county of Cuyahoga and State of Ohio, have invented new and useful Improvements in Clutches, of which the following is a specification.

This invention relates to a friction clutch of the type in which one clutch member is gripped between two other clutch members for transmitting power from a driving to a driven element.

The object of this invention is the production of a clutch of this character which will operate efficiently at high speed, which can be readily machined so as to permit of manufacturing the same at low cost, which requires no alterations in its bore within its range for adapting the same to shafts of different diameters, which is so organized that its gripping members have a greater clearance and no drag is possible when the clutch is open or released and which embodies a number of improvements in details of structure as will be hereinafter fully set forth.

Figure 1:
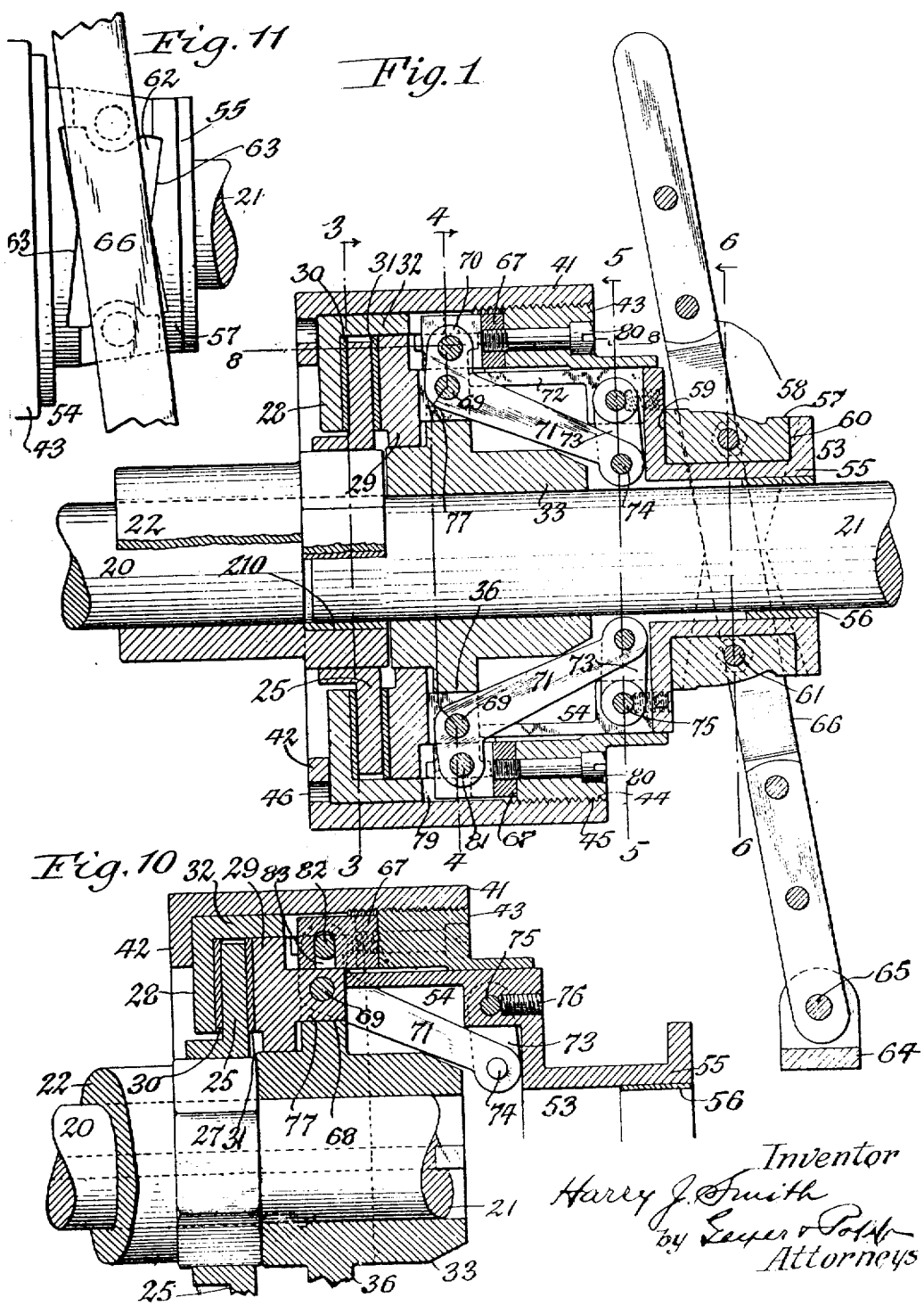
Figure 2:
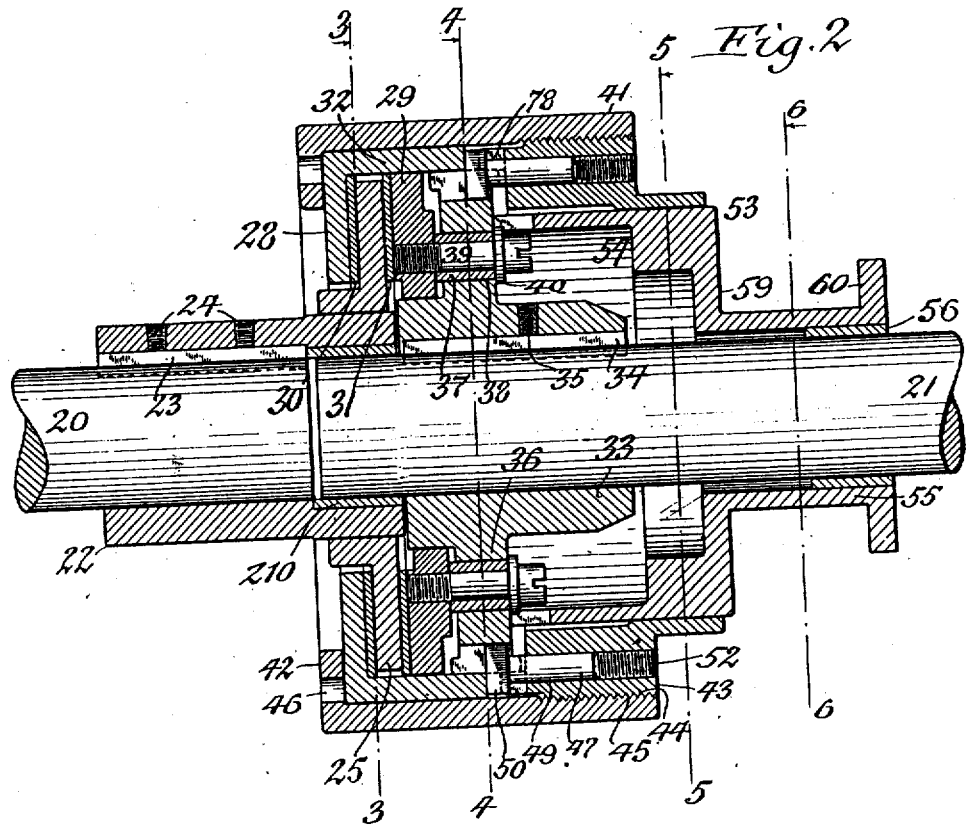

In the accompanying drawings: Figure 1 is a vertical longitudinal section of one form of my improved clutch showing the same in its closed or coupled condition. Figure 2 is a horizontal section of the same. Figures 3, 4, 5 and 6 are vertical transverse sections of the same taken on the correspondingly numbered lines in Figs. 1 and 2. Figure 7 is a top plan view of the clutch, partly in section. Figure 8 is a fragmentary longitudinal section taken on line 8—8, Fig. 1. Figure 9 is a fragmentary longitudinal section, on an enlarged scale, and with some parts omitted, showing the clutch opened or in uncoupled condition. Figure 10 is a fragmentary longitudinal section taken on line 10—10, Fig. 7. Figure 11 is a side elevation of the operating collar and a part of the operating lever. Figure 12 is a fragmentary longitudinal section, showing a modification of my improvement. Figure 13 is a section on line 13—13, Fig. 12. Figures 14 and 15 are fragmentary longitudinal sections showing another modified form of my invention.

Similar characters of reference indicate corresponding parts throughout the several views.

Figure 3:
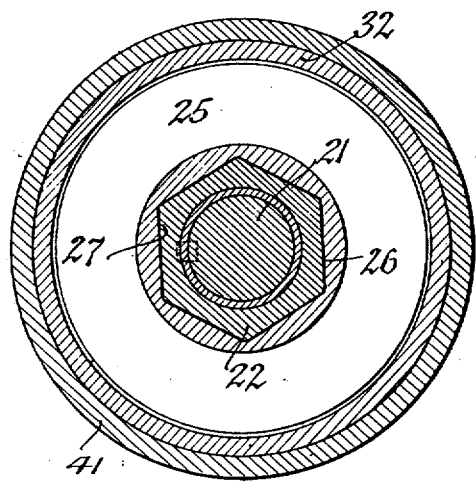

Although my improved clutch may be utilized for coupling and uncoupling any two members for transmitting rotary motion from one to the other, the same is shown in the accompanying drawings, for example, for coupling and uncoupling two shafts 20, 21, which are arranged axially in line and end to end, and the former in this instance serving as a driving shaft and the latter as a driven shaft. On the end of the driving shaft is mounted a coupling or clutch sleeve 22 which may be secured thereto in any suitable manner, so as to turn therewith, for instance, by means of a key 23 and set screws 24, as shown in Fig. 2. An intermediate clutch or coupling disk 25 is mounted on this coupling sleeve so as to be capable of moving axially relatively to the driving shaft and coupling sleeve but compelled to turn therewith, this being preferably accomplished by providing the center of this disk with a polygonal opening 26 which fits slidingly over a correspondingly-shaped periphery 27 on the coupling sleeve, as shown in Figs. 1, 3 and 9. The driven shaft 21 engages with a bushing 210 in the clutch sleeve 22.

28, 29 represent two gripping jaws or members which in this instance are constructed in the form of rings and between which the clutch disk is adapted to be gripped on its opposite flat sides. The outer or follower gripping ring 28 is arranged on the outer side of the clutch disk and the inner or hub gripping ring 29 on the inner side of the same. In order to increase the contact surface under pressure when the clutch is closed, two friction rings 30, 31, of brass, fibre or other suitable material are loosely arranged between opposite sides of the clutch disk and the opposing faces, respectively, of the outer and inner gripping rings. By this means the clutch can be coupled with reduced pressure or with a pressure usually required for operating the clutch, which increased area augments the capacity of the clutch. These two gripping rings are preferably held concentrically one relatively to the other and also guided axially as they move toward and from the clutch disk, this being preferably accomplished by providing the outer gripping ring at its outer edge with an inwardly projecting annular flange 32 which extends over the peripheral edge of the inner gripping disk, as shown in Figs. 1, 2 and 9. The friction rings 30, 31 are seated loosely at their outer edges within the bore of the flange 32 and are held thereby in their central position.

33 represents the hub of the clutch, preferably of tubular form, upon which part of the mechanism for operating the gripping rings or jaws is mounted and which may be secured to the end of the driven shaft by a key 34 and set screw 35, as shown in Fig. 2, or by any other suitable means. The inner end of the periphery of this hub preferably engages the bore of the inner gripping ring so as to aid in centering the same and between its ends the hub is provided with an annular flange 36 the periphery of which preferably engages with the bore of the flange 32, so as to aid in centering the latter and the parts associated therewith.

Figure 4:
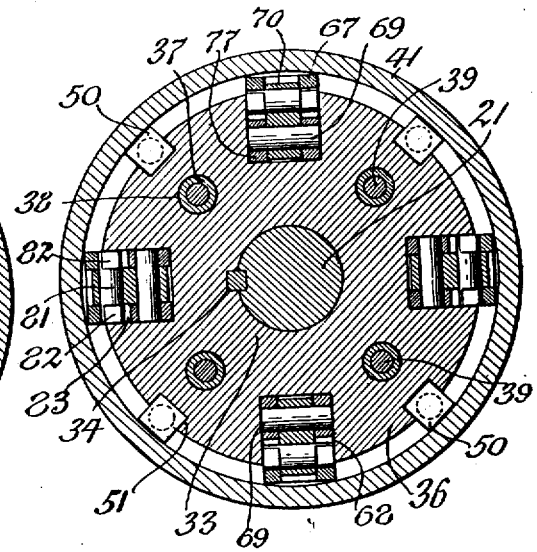
Figure 5:
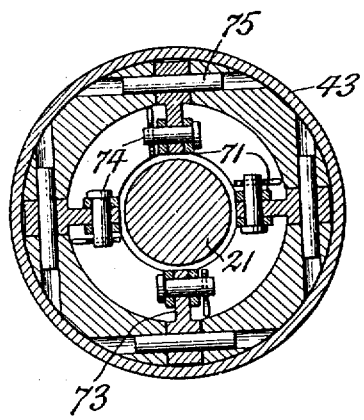
Figure 6:
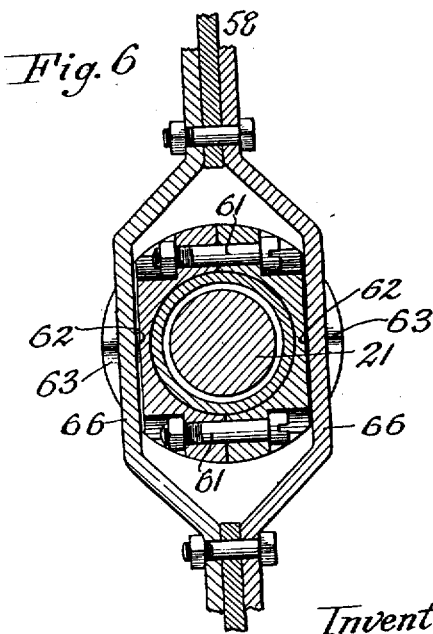

The backward movement of the inner gripping ring away from the clutch disk is preferably limited by engagement of the same with the front side of the hub-flange forming a stop, and means are also provided for limiting the movement of this ring toward the clutch disk. These means, as shown in Figs. 2 and 4, preferably comprise a plurality of guiding and spacing sleeves 37 which slide lengthwise in openings 38 formed in an annular row in the hub flange around the axis thereof and parallel therewith, a plurality of stop bolts 39 each arranged in one of said guide sleeves and engaging its threaded front end with the inner ring 29, and a plurality of washers 40 each of which engages with the head at the rear end of one of the stop bolts and between which and the inner gripping ring the respective guide sleeve is clamped at opposite ends thereof. The guide sleeves form a guide for the inner gripping ring on the hub and the washers 40 form stops which limit the extent of movement of this ring toward the clutch disk.

41 represents an adjusting ring or follower sleeve forming part of the means for adjusting the position of the gripping rings relative to the clutch disk when assembling the parts and also for taking up wear, so that the clutch will operate most effectively. This adjusting ring surrounds the outer gripping ring, the hub and associated parts and is provided at its front end with an inwardly projecting annular follower flange 42 which engages with the outer side of the outer gripping ring.

43 represents a shifting ring surrounding the rear part of the hub and provided on its periphery intermediate of its ends with an external screw thread 44 which engages with an internal screw thread 45 on the rear part of said adjusting ring. The inner or front end of the shifting ring is adapted to engage with the rear side of the hub flange and thereby serve as a stop to limit the distance which the outer gripping ring is moved away from the clutch disk upon releasing the clutch. For the purpose of adjusting the position of the outer gripping ring relatively to the shifting ring and incidentally the distance which the gripping rings move toward and from opposite sides of the clutch disk, as will presently appear, the adjusting ring is turned so as to cause the screw connection between the same and the shifting ring to move the outer gripping ring toward or from the clutch disk as required. This turning of the adjusting ring is preferably effected by inserting a spanner wrench in openings 46 formed in the follower flange of the adjusting ring. After adjustment the shifting ring and adjusting ring are held against circumferential displacement relatively to each other by a locking or detent device which preferably comprises a plurality of locking pins 47 arranged in an annular row around the axis of the clutch and sliding parallel therewith in guide openings 48 formed in the cylindrical rear parts of the openings 49 in the shifting ring, each of these pins being provided at its front end with a square or flattened head 50 which slides in a longitudinal slot 51 in the front edge of the shifting ring and bears against the inner or rear edge of the flange of the outer gripping ring, and a set screw 52 arranged in the rear internally threaded part of the respective opening 49. Upon loosening the screws 52 the adjusting ring may be turned freely and after the parts have been shifted into the proper position they are held in place by tightening these screws.

53 represents an operating spool or yoke movable lengthwise of the axis of the clutch and provided with an enlarged front part 54 which surrounds the rear part of the hub and slides into the adjusting ring while its rear part 55 is contracted and slides by means of an interposed bushing 56 on the adjacent part of the driven shaft. This operating spool is moved lengthwise of the clutch by means of a collar 57 mounted on the spool and a hand lever 58 engaging said collar. This collar is composed of two semi-cylindrical sections which embrace the contracted part of the spool between the front and rear shoulders 59, 60 thereon, these sections being connected by transverse bolts 61 arranged on opposite sides of the axis of the clutch. The outer sides of the collar sections are provided with notches or recesses each of which has a flat bottom 62 while its opposite side walls 63 are of V-shaped form, so that this recess enlarges from its central part toward opposite ends. The operating lever is pivoted at one end on any suitable stationary part, for instance on a bracket 64 by means of a pin 65, so that the lever swings lengthwise of the clutch and the central part of this lever is forked or bifurcated and has its branches 66 so arranged in the recess of the operating spool that the opposite edges of each branch fulcrum or rock on the summit parts of the V-shaped side walls, as shown in Fig. 11, thereby avoiding separated trunnions for this purpose. By this means the operating spool is compelled to move lengthwise with the collar and lever but is free to turn independently of the same.

The means for transmitting the longitudinally-reciprocating movement from the operating spool to the gripping members and associated parts are constructed as follows:

77 represents a plurality of bifurcated fulcrum lugs arranged in an annular row on the rear side of the inner gripping ring and each projecting rearwardly from this ring through a radial slot 68 arranged in the hub flange and extending to the edge thereof. On each of these fulcrum lugs an elbow clamping lever is pivoted by means of a transverse pin 69, so that the short front arm 70 of this lever projects radially outward from this pin while its long rear arm 71 projects longitudinally rearward from the same. Any suitable number of the fulcrum lugs and clamping levers may be employed, four sets of the same being shown as an example in the drawings and arranged equidistant around the axis of the clutch. The long rear arms of the clamping levers are arranged within the enlarged front part of the operating spool and each of these arms extends through the front part of a longitudinal slot 72 in this part of the spool, so that they clear each other and are also maintained circumferentially in alinement relatively to each other. 73 represents a plurality of radial links each of which is pivotally connected at its inner end by a pin 74 with the rear end of the long arm of one of the clamping levers while its outer end is pivoted on the operating spool within the rear end of one of the slots 72 by means of a transverse pin 75, the latter being held against displacement by a set screw 76 arranged on the spool and engaging with the side of this pin, as shown in Figs. 1 and 10. In the closed or coupled position of the clutch the several links project inwardly from their pivotal supports on the spool, as shown in Fig. 1, while in the open or uncoupled position of the same, these links project forward from their pivotal connections with the spool and substantially parallel with the axis of the clutch, as shown in Fig. 9.

67 represents a plurality of fulcrum blocks which are arranged in an annular row around the axis of the clutch and each of which is of bifurcated form with its branches projecting forwardly and arranged with its rear end in a longitudinal slot 78 in the inner or front edge of the shifting ring 43, while its front end is arranged in a longitudinal slot 79 in the rear edge of the annular flange 32 of the outer gripping ring 28. Each of the fulcrum blocks is secured at its rear end to the shifting ring by means of a screw 80, as shown in Fig. 1, or by any other suitable means. The outer end of the short arm of each clamping lever is arranged between the branches of one of the fulcrum blocks and pivotally connected therewith by a transverse pin having a cylindrical central part 81 which is seated in a correspondingly shaped opening in the respective clamping lever, as shown in Figs. 1, 4 and 9, and flattened ends 82 which engage with inwardly-opening slots 83 formed radially in the branches of the fulcrum block, as shown in Figs. 4, 8 and 10. By this means the clamping levers are capable of turning relatively to the fulcrum blocks notwithstanding that the latter move tangentially relatively to the axis of the clamping lever, thereby avoiding a cramping action between these parts. By engaging each of the fulcrum blocks with longitudinal slots in the shifting ring and the flange of the outer gripping ring and arranging the clamping levers in slotted lugs on the inner gripping ring and longitudinal slots in the operating spool, these several parts are held against circumferential displacement relatively to each other and thereby enabling the parts to move freely lengthwise of the axis of the clutch without any cramping action.

Upon moving the operating spool forwardly by means of the operating lever and connecting parts, the links are shifted from the longitudinal position shown in Fig. 9 to the transverse position shown in Fig. 1, whereby a toggle action is produced which causes the long rear arms of the several clamping levers to be turned inwardly toward the axis of the clutch with a toggle action. When the clamping levers are turned in this direction the fulcrums of the same float or slide toward the clutch disk together with the inner gripping disk on which they are pivotally mounted and the short arms of the several clamping levers move rearwardly or away from the clutch disk, thereby moving the outer gripping ring toward the opposite side of the clutch disk, whereby the latter is gripped between the two gripping rings and the two shafts are coupled. The extent of the forward movement at this time is preferably such that the outer ends of the links are carried slightly in advance or beyond the dead center on a radial line drawn through the pivotal connections between each link and the longitudinal arm of the respective clamping lever, as shown in Fig. 1, whereby the clutch is locked in its coupled or closed position. Upon moving the operating lever and spool backwardly, the links are shifted from a radial position to a longitudinal position and the clamping levers are turned so that their long arms are moved laterally outward from the axis of the clutch and the short arms of the same are moved toward the clutch disk, thereby causing the fulcrums of the clamping levers to move away from the inner side of the clutch disk and the outer gripping ring to move away from the outer side of the clutch disk, thus effecting opening or uncoupling of the clutch. The separation of the gripping rings at this time from opposite sides of the clutch is limited by engagement of the inner gripping ring with the front side of the hub flange and the engagement of the adjusting ring with the rear side of the same, as shown in Fig. 9, so that the opposite sides of the hub flange form stops or abutments for this purpose.

If, for any reason, the inner gripping ring should work hard or tend to stick when moving the operating spool forwardly, then the clamping levers during the first part of their closing movement will simply rock on the inner gripping ring and the entire shifting effect of these levers will be transmitted to the outer gripping ring until the latter has engaged the outer side of the clutch disk through the medium of the outer friction ring, but during the continued turning movement of the clamping levers in the same direction the connection between the short arms of these levers and the adjusting ring will form the fulcrum for the same, thereby causing the inner gripping ring and the pivotal connections between the same and this ring to be forced toward the clutch disk until the latter is engaged on its inner side by the inner gripping ring through the medium of the inner friction disk. In like manner, if the outer gripping ring and associated parts should stick or move sluggishly when operating the spool for closing or coupling the clutch, then the inner gripping ring together with the pivotal connection between the same and the clamping levers will be moved toward the inner side of the clutch first, after which the shifting ring, adjusting ring and outer gripping ring will be moved forcibly in the direction for engaging the latter with the opposite side of the clutch ring.

If, upon moving the operating spool backwardly for uncoupling the clutch, there should be any retarding or resistance to the opening movement of the outer gripping ring and connected parts, then the first effective movement would be performed by the inner gripping ring and the pivotal connection between the same and the clamping levers until this ring is arrested by engagement with the front side of the hub flange, after which the outer gripping ring and connected parts would be compelled to move in the direction for opening the clutch until the shifting ring engaged the rear side of the hub flange. In like manner, should the inner gripping ring act less promptly than the outer gripping ring upon moving the spool for opening the clutch, then the outer gripping ring would be first moved away from the outer side of the clutch disk until arrested by engagement of the shifting ring with the rear side of the hub flange after which the inner gripping ring would also be forcibly moved away from the inner side of the clutch disk during the continued opening movement of the spool until the inner gripping ring is arrested by engagement with the front side of the hub flange.

It will thus be apparent that under all circumstances when closing the clutch both gripping members will be compelled to engage with opposite sides of the clutch disk and that the pressure of the gripping members will be equally divided between them, so as to produce uniform wear. It will also be obvious that in this clutch both gripping members are compelled to recede the same distance from opposite sides of the clutch disk when the clutch is uncoupled, thereby leaving the clutch stand perfectly free and in a substantially fixed position which avoids any dragging effect on the clutch and prevents unnecessary wear upon the same at this time.

During both the coupling and uncoupling action of the clutch each of the clamping levers swings about two floating fulcrums both of which have a plain translation or effect a direct transmission of power from this lever to the two gripping members, one of these fulcrums being the pivotal connection between the lever and the inner gripping member and causing this lever at times to operate as one of the first class while the other fulcrum consists of the pivotal connection between the lever and the shifting ring which at times causes the lever to operate as one of the second class. The pivotal connection between each clamping lever and the shifting ring also turns bodily with this lever and effects a slight translation of movement by reason of its sliding action in the companion fulcrum block.

For the purpose of taking up any wear between the clutch disk, friction rings and gripping rings, it is only necessary to first release the locking pins 47, then turn the adjusting ring the required extent to take up this wear, after which the locking pins are again tightened for holding the parts in their adjusted positions.

If the wear upon opposite sides of the clutch disk or the gripping rings and friction disks should be uneven, the clutch disk will accommodate itself to this difference by sliding axially on the coupling or clutch sleeve 22, thereby adapting the clutch to this changed condition without in any way unbalancing the operation of the clutch. By thus slidably mounting the clutch disk on its shaft, an axial movement of the two shafts relatively to each other is possible without disturbing the working of the clutch. By mounting the operating spool on its shaft by means of an interposed bushing it is possible to use the same spool for one size of clutch in connection with shafts of different diameters inasmuch as it is only necessary to employ a bushing of the required bore for mounting this spool on a particular size of shaft.

Owing to the absence of any trunnions between the operating lever and the shifting collar, the construction is very much simplified, its strength is increased and the wear is reduced.

In addition to causing the inner or hub gripping ring to engage with and disengage from the inner side of the clutch disk by the action of the clamping levers and intermediate transmitting elements connected therewith, this is supplemented by the practically direct action of the operating spool which during its forward motion engages by a direct push with the fulcrum lugs on the inner gripping ring and also is disengaged therefrom by a direct pull when opening the clutch.

It will be noted that in the assembled position of the parts of the clutch, the fulcrum pin 69 which pivotally connects each clamping lever with the respective fulcrum lug on the inner or hub gripping ring has its opposite ends arranged opposite the longitudinal walls of the slot 68 in the hub flange, whereby this pin is prevented from becoming detached without requiring any special means for this purpose.

The modification of my invention shown in Figs. 12 and 13 is constructed as follows:

84 represents a follower or adjusting ring which is provided at one end with a follower flange 85 bearing against the outer side of the clutch disk 86 through the medium of the friction ring 87. The other end of this adjusting ring is provided with an internal screw thread which receives an external thread on a shifting ring 88. Between its ends this adjusting ring is provided internally with a plurality of longitudinal key seats or guideways 89 each of which receives a longitudinally adjustable fulcrum block 90 which latter is locked in position by engagement of its rear side with the shifting ring while its front side is provided with a locking pin 91 projecting forwardly into an opening 92 in the adjusting ring and engaged by a set screw 93 mounted on the adjusting ring. The flange 94 of the hub 95 is provided with a radial slot 96 each of which receives one of the fulcrum blocks and also one of the fulcrum lugs 97 which projects rearwardly from the rear or hub gripping ring 361. Each of the elbow clamping levers 98 is pivoted at its angle by a pin 99 on the fulcrum lug and at the outer end of its short transverse arm to the follower block 90 by a cross pin 100.

Upon turning the lever 98 in one direction, the two gripping members 361 and 85 are pressed against opposite sides of the clutch disk 86 so as to close or couple the clutch, and when turning these levers in the opposite direction, these gripping members are withdrawn from the clutch disk, the extent of this withdrawal being limited by the hub gripping ring 361 engaging with the front side of the hub flange and the front side of the shifting ring 88 engaging with the rear side of the hub flange. For adjusting the clutch to take up wear the set screw 93 is retracted and the shifting ring 88 is turned by applying a spanner wrench to openings 101 until the distance between the follower flange 85 and the shifting ring 88 has been reduced the required extent, after which the parts are again locked in place. The operation of this construction in other respects is similar to that described with reference to the construction shown in Figs. 1–10.

Some of the advantages above enumerated are embodied in the modified construction shown in Figs. 14 and 15. In these figures 102 represents one of the clamping levers which is pivoted to the flange 136 of the hub 104 by means of a pin 105 and the hub gripping ring 106 is secured to the front side of the hub flange by means of screws one of which is shown at 107. The clutch disk 108 in this case is slidable axially on the clutch sleeve 22 but compelled to turn therewith, as in the previous structure, and the same is engaged on its rear side by the hub gripping ring 106 and on its front side by a follower gripping ring 109 which latter has a flange 110 projecting over the clutch disk and hub gripping ring. The adjusting ring 84 in this case is also provided with a front flange 85 engaging with the outer gripping ring 109 while its rear end has a screw connection with a shifting ring 111. A fulcrum block 114 is secured to the latter by means of a screw 115 which block projects into a slot 116 in the flange of the outer gripping ring 109 and is pivotally connected with the short arm of the elbow lever by means of a pin 117. The long arm of the clamping lever is connected with the longitudinally movable spool 53 by means of the link 73. Locking of the adjusting ring relatively to the shifting ring is effected by a locking pin 48 sliding in the shifting ring and engaging with the flange of the outer gripping ring and a set screw 52 arranged on the shifting ring and engaging with the locking pin. In this construction the entire coupling and uncoupling movement is effected by the outer or front gripping ring 109 but in other respects the operation is the same as that shown in Figs. 1–10.

The several constructions of my invention hereinbefore set forth are all capable of being used in transmission of power at high speed, and as most of its parts are of circular form which can be readily machined all over to secure proper balance, it is possible to produce the same economically in quantities. Furthermore, this clutch due to its round form is not only symmetrical but also well balanced, it is very safe inasmuch as the clothing of the operatives is not liable to become caught on the same, its working parts are also enclosed so that the same is dirt proof and not liable to wear unduly and its parts are all of simple construction so that the same can be produced at low cost.

I claim as my invention:

1. A clutch including an intermediate clutch member adapted to be mounted on one of the elements to be coupled, two gripping members arranged on opposite sides of the intermediate clutch member and adapted to be mounted on the other element to be coupled, and means for positively moving said gripping members a predetermined distance toward and from opposite sides of said intermediate clutch member including a lever operatively connected with both of said gripping members, and a hub which receives the reaction of said gripping members upon operating the lever for either opening or closing the clutch.

2. A clutch for coupling and uncoupling two rotary elements comprising an intermediate clutch member adapted to be mounted on one of said elements, two gripping members adapted to engage opposite sides of said intermediate member and adapted to be mounted on the other of said elements, and means for actuating said gripping members including a clamping lever operatively connected with both of said gripping members, the connection between said lever and at least one of said gripping members having a sliding action and a hub mounted on one of said elements and adapted to receive the reaction of said gripping members upon opening and closing the clutch.

3. A clutch for coupling and uncoupling two rotary elements comprising an intermediate clutch member adapted to be mounted on one of said elements, two gripping members adapted to engage opposite sides of said intermediate member and adapted to be mounted on the other of said elements, and means for actuating said gripping members including a clamping lever operatively connected with both of said gripping members and both of said connections between said lever and said gripping members forming floating fulcrums for said lever and a hub which is mounted on one of said elements and which serves as a stop to limit the opening movement of both of said gripping members.

4. A clutch for coupling and uncoupling two rotary elements comprising an intermediate clutch member adapted to be mounted on one of said elements, two gripping members adapted to engage opposite sides of said intermediate member and adapted to be mounted on the other of said elements, and means for actuating said gripping members including a clamping lever which is pivoted on one of said gripping members and is slidingly connected with the other gripping member and a hub which is mounted on one of said elements and which serves as a stop to limit the opening movement of both of said gripping members.

5. A clutch for coupling and uncoupling two rotary elements comprising an intermediate clutch member adapted to be mounted on one of said elements, a hub adapted to be mounted on the other of said elements, two gripping members adapted to engage with opposite sides of said clutch member and one of said gripping members being mounted on said hub, and means for actuating said gripping members including a lever which is pivoted on the gripping member which is mounted on the hub, an external adjusting ring engaging the other gripping member, and an internal shifting ring adjustably connected with said adjusting ring and pivotally connected with said lever.

6. A clutch for coupling and uncoupling two rotary elements comprising an intermediate clutch member adapted to be mounted on one of said elements, a hub adapted to be mounted on the other of said elements, two gripping members adapted to engage with opposite sides of said clutch member and one of said gripping members being mounted on said hub, and means for actuating said gripping members including a lever which is pivoted on the gripping member which is mounted on the hub, an adjusting ring engaging the other gripping member, a shifting ring adjustably connected with said adjusting ring, and a fulcrum block mounted on said shifting ring and slidingly connected with said lever.

7. A clutch for coupling and uncoupling two rotary elements comprising an intermediate clutch member adapted to be mounted on one of said elements, a hub adapted to be mounted on the other of said elements, two gripping members adapted to engage opposite sides of said intermediate clutch member, one of said gripping members being mounted on said hub, an external adjusting ring engaging with the other gripping member, a lever associated with said gripping members, an internal shifting ring adjustably connected with said adjusting ring and pivotally connected with said lever, and means for locking said adjusting and shifting rings against movement relatively to each other.

8. A clutch for coupling and uncoupling two rotary elements comprising an intermediate clutch member adapted to be mounted on one of said elements, a hub adapted to be mounted on the other of said elements, two gripping members adapted to engage opposite sides of said intermediate clutch member, one of said gripping members being mounted on said hub, and the other gripping member having a flange, an adjusting ring having a flange which engages the gripping member having a flange a lever associated with said gripping members, a shifting ring having a screw connection with said adjusting ring, and a pivotal connection with said lever, and means for locking said adjusting ring and shifting ring against movement relatively to each other.

9. A clutch for coupling and uncoupling two rotary elements comprising an intermediate clutch member adapted to be mounted on one of said elements, a hub adapted to be mounted on the other of said elements, two gripping members adapted to engage opposite sides of said intermediate clutch member, one of said gripping members being mounted on said hub and the other gripping member having a flange, an adjusting ring having a flange which engages the gripping member having a flange a lever associated with said gripping members, a shifting ring having a screw connection with said adjusting ring and pivotal connection with said lever, and means for locking said adjusting ring and shifting ring against movement relatively to each other, comprising a locking pin engaging with the flange of said flanged gripping member and guided on said shifting ring, and a set screw arranged on said shifting ring and engaging said locking pin.

10. A clutch for coupling and uncoupling two rotary elements comprising an intermediate clutch member adapted to be mounted on one of said elements, a hub adapted to be mounted on the other of said elements, two gripping members adapted to engage opposite sides of said intermediate clutch member, one of said gripping members being mounted on said hub and the other gripping member having a flange, an adjusting ring having a flange which engages the gripping member having a flange a lever associated with said gripping members, a shifting ring having a screw connection with said adjusting ring and a pivotal connection with said lever, and means for locking said adjusting ring and shifting ring against movement relatively to each other, comprising a locking pin engaging with the flange of said flanged gripping member and guided on said shifting ring, and a set screw arranged on said shifting ring and engaging said locking pin, said locking pin being provided with a flattened head, and said shifting ring and said hub being provided with guideways which receive said head.

11. A clutch for coupling and uncoupling two rotary elements comprising an intermediate clutch member adapted to be mounted on one of said elements, a hub adapted to be mounted on the other of said elements, two gripping members adapted to engage opposite sides of said intermediate clutch member, one of said gripping members being mounted on said hub, an adjusting ring operatively related to the other gripping member, a shifting ring having a screw connection with said adjusting ring, and a lever connected with said adjusting ring and operatively associated with said gripping member which is on the hub.

12. A clutch for coupling and uncoupling two rotary elements comprising an intermediate clutch member adapted to be mounted on one of said elements, a hub adapted to be mounted on the other of said elements, two gripping members adapted to engage opposite sides of said intermediate clutch member, one of said gripping members being mounted on said hub, an adjusting ring operatively related to the other gripping member, a shifting ring having a screw connection with said adjusting ring, a lever connected with said adjusting ring and operatively associated with said gripping member which is on the hub, and means for locking said adjusting ring and shifting ring against rotation relatively to each other.

13. A clutch for coupling and uncoupling two rotary elements comprising an intermediate clutch member adapted to be mounted on one of said elements, a hub adapted to be mounted on the other of said elements and provided with a flange, a gripping member interposed between one side of said clutch member and said hub flange, means for guiding said gripping member on said hub flange including a guide sleeve engaging one end with one side of said gripping member and sliding in said hub flange, a screw arranged in said sleeve and secured to said gripping member, and a washer arranged between the head of said screw and the opposite end of said sleeve and adapted to engage a side of said hub flange, a gripping member arranged on the opposite side of said clutch member, and means for moving said gripping members toward and from opposite sides of said clutch member.

14. A clutch for coupling and uncoupling two rotary elements comprising an intermediate clutch disk adapted to be mounted on one of said elements, a hub adapted to be mounted on the other of said elements, a gripping ring arranged between one side of said clutch disk and said hub, another gripping ring arranged on the opposite side of said clutch disk and having an annular flange provided with a longitudinal slot, an adjusting ring provided with a flange engaging with the outer side of said flanged gripping ring, a shifting ring having a screw connection with said adjusting ring and provided with a longitudinal slot in line with the slot in said gripping ring flange, a fulcrum block secured in the slot of said shifting ring and projecting into the slot of said gripping ring flange, and a lever pivotally connected with the fulcrum block.

15. A clutch for coupling and uncoupling two rotary elements comprising an intermediate clutch disk adapted to be mounted on one of said elements, a hub adapted to be mounted on the other of said elements, a gripping ring arranged between one side of said clutch disk and said hub, another gripping ring arranged on the opposite side of said clutch disk and having an annular flange provided with a longitudinal slot, an adjusting ring provided with a flange engaging with the outer side of said flanged gripping ring, a shifting ring having a screw connection with said adjusting ring and provided with a longitudinal slot in line with the slot in said gripping ring flange, a fulcrum block secured in the slot of said shifting ring and projecting into the slot of said gripping ring flange and provided with a transverse slot, a pivot pin having a flattened part engaging with said slot and also provided with a round part, and a lever having an opening which receives the round part of said pin.

HARRY J. SMITH.